United States Patent Office 2,774,793
Patented Dec. 18, 1956

2,774,793

WEAKLY BASIC ORGANIC SULFONIUM COMPOUNDS

Geert J. De Jong and Johannes A. Zeegers, Geleen, Netherlands, assignors to Stamicarbon N. V., Heerlen, Netherlands No Drawing. Application May 28, 1953,
Serial No. 358,175

Claims priority, application Netherlands June 5, 1952

4 Claims. (Cl. 260—607)

Our invention relates to a method of preparing low molecular weakly basic organic sulfonium compounds, which are believed to be new per se.

The main object of our invention is to prepare sulfur compounds of the kind specified which are suited to be converted into weakly basic anion exchangers.

A further object of our invention is to prepare sulfur compounds of the kind specified which, in contradistinction to the known strongly basic sulfonium compounds, are resistant to strongly alkaline liquors such as caustic soda.

Another object of our invention is to prepare sulfur compounds of the kind specified which, in contradistinction to known strongly basic sulfonium compounds, are stable at relatively high temperatures.

A further object of our invention is to provide a process for the preparation of sulfur compounds of the kind specified wherein said compounds are obtained practically free from strongly basic sulfonium compounds whose formation would be simultaneously possible.

Further objects of our invention will appear hereinafter and in the claims hereof.

It is known that triaryl sulfonium compounds have strongly basic properties. These compounds, which, among other applications, are used in industry for the removal of acid components from hydrocarbons, are for the greater part not very resistant to strongly alkaline liquors such as caustic soda.

Various methods for the preparation of these tertiary sulfonium compounds are known. Triaryl sulfonium compounds may, e. g., be prepared from an alkoxy-aryl compound and a thionyl halogenide or $SO_2$, if necessary under the influence of $AlCl_3$ or another substance promoting cationoid substitution. In this reaction one may also start from a halogenide of an arylsulfinic acid or from a diarylsulfoxide, which, together with an alkoxy-aryl compound, can react under the influence of a substance promoting cationoid substitution to produce a sulfonium compound.

As the reaction substances decompose easily under the influence of $AlCl_3$ these syntheses are always carried out at temperatures as low as possible.

It was found that strongly basic triaryl sulfonium hydroxides of which at least one of the aryl groups carries an alkoxy-group may be converted, under the influence of strongly alkaline liquors at a temperature between 75 and 150° C., into a new type of compounds which have weakly basic properties.

Heating of the strongly basic triaryl sulfonium hydroxide in an aqueous solution, but without alkaline lye, produces only an incomplete conversion to the weakly basic compound. Heating of the strongly triaryl sulfonium base in diluted alkaline lye at 90° C. results in a slow conversion. At 120° C. the conversion is completed in about 10 hours, at 140° C. the reaction is usually finished within 1 hour. Above 150° C. decomposition of the new compound occurs.

The same weakly basic compounds may also be obtained in good yields by carrying out the preparation of the triaryl sulfonium compounds in which the sulfur atom is introduced into an alkoxy-aryl compound by the action of $SO_2$, a thionyl halogenide, a halogenide of an aryl-sulfinic acid or a diaryl sulfoxide at a temperature higher than that at which the strongly basic tertiary sulfonium compounds are formed in good yields, but lower than that at which decomposition of the reaction products occurs. If anisole is used as a reaction component the reaction temperature may, e. g., be 70° C. With phenetole, however, the reaction temperature should be chosen lower (about 50° C.).

In an accurate analysis of the strongly basic triaryl sulfonium compounds prepared at low temperatures, it was found that small quantities of the weakly basic compound are formed even at these temperatures. The ratio between the amounts of weakly basic and strongly basic compound simultaneously formed is consequently dependent upon the temperature.

For instance, in the reaction of anisole with $SOCl_2$ in the presence of $AlCl_3$ at a reaction temperature of 20–30° C. the strongly and weakly basic compounds are formed in the ratio 4:1. At a temperature of 70° C. this ratio is 1:10. At 90° C. only resinous products—part of which are sulfides—are formed.

Though the preparation of triaryl sulfonium compounds along these lines has been known for a long time, this fact has not been observed up to the present.

The same new weakly basic compounds may also be obtained by reacting a diaryl sulfoxide with a hydroxy-aryl compound in the presence of a substance promoting cationoid substitution, such as, e. g., concentrated sulfuric acid. Weakly basic anion exchangers, prepared from the weakly basic compounds according to our invention, are described in our co-pending application Serial No. 358,176, filed on even date herewith.

The following examples illustrate the nature of the invention and the manner in which it may be carried into effect. It is to be understood, that our invention is not limited thereto.

*Example 1*

410 parts by weight of trianisyl sulfonium hydroxide together with 250 parts by weight of a 4% solution of caustic soda are heated in an autoclave at a temperature of 120° C. during 10 hours. A complete conversion into a weak base takes place. The resulting weak base can be titrated with methyl red in an aqueous solution. The chloride of the weak base yields with $HgCl_2$ an addition compound having a melting point of 145° C. (melting point of the corresponding compound from tri(para)-anisyl sulfonium chloride: 171° C.).

*Example 2*

100 parts by weight of dry powdery $AlCl_3$ are dissolved in 108 parts by weight of anisole, the temperature being at first kept below 50° C. After the solution has been brought to a temperature of 70° C., 44 parts by weight of thionyl chloride are added slowly, after which the reaction mixture is kept at a temperature of 70° C. for two hours. A viscous mass is formed which is poured into 500 parts by weight of water at room temperature. The resulting hydrochloride then separates off as a syrupy mass. From this by-products are removed by a treatment with 500 parts by weight of hot water in which only the hydrochloride dissolves. From the resulting aqueous solution the hydrochloride is salted out, dissolved in 50% methanol and converted over a strongly basic anion exchanger into a base. The resulting weak base is identical to that of Example 1. The yield is about 80%.

The same result can be obtained by using in the reaction 24 parts by weight of sulfur dioxide instead of thionyl chloride.

If the operation is carried out at a temperature of from 20–30° C. instead of 70° C. it appears that mainly the strongly basic trisulfonium compound is formed, and only about 20% of the weakly basic compound.

*Example 3*

A mixture of 94 parts by weight of phenol and 262 parts by weight of dianisyl sulfoxide was added slowly while stirring to 940 parts by weight of concentrated sulfuric acid (S. G. 1.84), the temperature being kept below 20° C. A deep green solution was formed. The reaction was complete within about 10 minutes. The resulting liquid was diluted with 9400 parts by weight of hot water; subsequently barium hydroxide solution is added until no further precipitate was formed. After filtration of the $BaSO_4$ formed and neutralisation with hydrochloric acid the hydrochloride could be obtained as a clear and very viscous liquid by means of extraction with chloroform.

The hydrochloride could, in a methanolic solution, be converted, with the help of a strongly basic anion exchanger, into a weakly basic compound, identical with that prepared according to Example 1.

We claim:

1. A process of preparing a weakly basic, low molecular weight organic sulfonium compound comprising heating a tri-lower alkoxy phenyl sulfonium hydroxide with dilute alkali at a temperature between 75 and 150° C.

2. A process as claimed in claim wherein trianisyl sulfonium hydroxide is the trialkoxy phenyl sulfonium hydroxide.

3. A weakly basic, low molecular weight organic sulfonium compound characterized by its resistance to caustic soda, and its stability at temperatures of up to 150° C., and comprising the reaction product obtained by heating a tri-lower alkoxy phenyl sulfonium hydroxide with dilute alkali at a temperature of between 75 and 150° C.

4. A weakly basic, low molecular weight organic sulfonium compound characterized by its resistance to caustic soda and its stability at temperatures of up to 150° C., and comprising the reaction product obtained by heating trianisyl sulfonium hydroxide with dilute alkali at a temperature between 75 and 150° C.

References Cited in the file of this patent

Smiles et al.: I. Chemical Society Journal (New Series), vol. 89, part 1, pages 696–708.

Smiles et al.: II. Chemical Society Journal (New Series), vol. 93, part I, pages 745–62.

Conant: The Chemistry of Organic Compounds (1947), the MacMillan Co., pages 167–169 and 267.

Fieser et al.: Organic Chemistry, 2nd ed., Heath and Co. (1950), page 32.